(12) United States Patent
Daudin et al.

(10) Patent No.: US 8,546,626 B2
(45) Date of Patent: Oct. 1, 2013

(54) METHOD OF CONVERTING EFFLUENTS OF RENEWABLE ORIGIN INTO FUEL OF EXCELLENT QUALITY BY USING A MOLYBDENUM-BASED CATALYST

(75) Inventors: Antoine Daudin, Corbas (FR); Laurent Bournay, Chaussan (FR); Thierry Chapus, Lyons (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 862 days.

(21) Appl. No.: 12/644,710

(22) Filed: Dec. 22, 2009

(65) Prior Publication Data

US 2010/0163458 A1 Jul. 1, 2010

(30) Foreign Application Priority Data

Dec. 23, 2008 (FR) ...................................... 08 07416

(51) Int. Cl.
*C07C 1/00* (2006.01)
(52) U.S. Cl.
USPC ............................ 585/240; 585/242; 585/733
(58) Field of Classification Search
USPC ............. 585/240, 242, 733; 60/405; 44/605, 44/606
See application file for complete search history.

(56) References Cited

U.S. PATENT DOCUMENTS

| 4,992,605 | A | * | 2/1991 | Craig et al. | 585/240 |
|---|---|---|---|---|---|
| 7,232,935 | B2 | * | 6/2007 | Jakkula et al. | 585/240 |
| 7,511,181 | B2 | * | 3/2009 | Petri et al. | 585/240 |
| 7,550,634 | B2 | * | 6/2009 | Yao et al. | 585/240 |
| 8,026,401 | B2 | * | 9/2011 | Abhari et al. | 585/240 |
| 8,119,847 | B2 | * | 2/2012 | Dindi et al. | 585/240 |
| 2005/0211603 | A1 | | 9/2005 | Guillaume et al. | |
| 2008/0312480 | A1 | | 12/2008 | Dindi et al. | |
| 2009/0166260 | A1 | | 7/2009 | Kressmann et al. | |

FOREIGN PATENT DOCUMENTS

| EP | 1 956 070 A1 | 8/2008 |
|---|---|---|
| WO | WO 2007/080288 A1 | 7/2007 |
| WO | WO 2007 141293 | * 12/2007 |

OTHER PUBLICATIONS

Search Report of FR 0807416 (Jul. 16, 2009.

* cited by examiner

*Primary Examiner* — Nina Bhat
(74) *Attorney, Agent, or Firm* — Millen, White, Zelano & Branigan, P.C.

(57) ABSTRACT

The invention is concerned with a supported or unsupported catalyst comprising an active phase constituted by a sulfur-containing group VIB element, the group VIB element being molybdenum, and a hydrodeoxygenation process with a yield of hydrodeoxygenation product which is greater than or equal to 90% of charges from renewable sources using a catalyst according to the invention.

22 Claims, No Drawings

METHOD OF CONVERTING EFFLUENTS OF RENEWABLE ORIGIN INTO FUEL OF EXCELLENT QUALITY BY USING A MOLYBDENUM-BASED CATALYST

FIELD OF INVENTION

On an international level, the years 2005-2010 have been marked firstly by a rapid increase in the need for fuel, particularly gas oil-based fuels within the European Community, and, secondly, by the major problems associated with global warming and greenhouse gas emissions. It is therefore desirable to reduce energy dependency as far as raw materials of fossil origin are concerned, and to reduce $CO_2$ emissions. Within this context, the search for new charges from renewable sources which can be readily integrated into traditional refining and fuel production arrangements is an objective of increasing importance.

Thus, during these last few years the integration into the refining processes of new products of vegetable origin resulting from lignocellulose biomass conversion or from the production of vegetable oils or animal fats has undergone a revival of interest due to the increase in cost of fossil materials. Likewise, traditional biofuels (mainly ethanol or methyl esters of vegetable oils) have gained real status as supplements for petroleum bases in gasoline pools.

The high demand for gas oil fuels, added to the significant level of concern over the environment underpins the interest in using charges from renewable sources. Of these charges, the following can be cited as examples: vegetable oils or oils of algae origin, animal fats or used cooking oils in the crude form or having undergone a pre-treatment, and mixtures of such charges. These charges essentially contain chemical structures of the triglyceride type which the skilled person also knows by the name of fatty acid triesters and fatty acids.

The very high molecular mass (above 600 g/mole) of triglycerides and the high viscosity of the charges under consideration mean that their use directly or as an admixture in gas oils presents problems for modern HDI engines (compatibility with the very high-pressure injection pumps, uncontrolled combustion, low yields, toxic unburned emissions). However, the hydrocarbon chains which make up the triglycerides are mainly linear and their length (the number of carbon atoms) is compatible with the hydrocarbons present in gas oils. Furthermore, the initiation number of these chains is generally between 0 and 3, but can be higher, particularly in the case of algae-originating oils.

Therefore, following the mixing or addition of an additive known to the skilled person, it is necessary to convert these charges in order to obtain a gas oil base of good quality and/or a kerosene cut which meets the requirements in force. For diesel, the end fuel must comply with Standard EN590, and for kerosene it must comply with the specifications described in IATA (International Air Transport Association) Guidance Material for Aviation Turbine Fuel Specifications such as Standard ASTM D1655.

One possible approach consists in conversion of the charges by transesterification. The triglycerides, which essentially constitute such charges, are thus converted in the presence of an aliphatic monoalcohol into fatty acid esters and into glycerine by means of a transesterification reaction. This reaction can be catalysed by a catalyst in homogeneous or heterogeneous phase. The drawbacks of this method include: a) an increase in $NO_x$ emissions in the exhaust gases of internal combustion engines due to the presence of oxygen in the esters; b) a fairly high boiling temperature, of about 360° C., which can present problems with regard to the specifications which the end point of the gas oil has to satisfy; c) obtaining a non-maximised cetane index (approx. 50 which is the minimum required for gas oil); and d) problems associated with the stability of the oxidation reaction due to the presence of double bonds on the hydrocarbon chains.

Another possible method is catalytic conversion of the vegetable oil into deoxygenated paraffinic fuel in the presence of hydrogen (hydrotreatment). A number of metal or sulfur-containing catalysts are known to be active for this type of reaction. These processes for the hydrotreatment of vegetable oils are already well-known and are described in numerous patents. The following patents may be cited as examples: U.S. Pat. No. 4,992,605, U.S. Pat. No. 5,705,722, EP 1,681,337 and EP 1,741,768.

By way of example, EP 1,681,337 describes a process for the conversion of charges from renewable sources by means of a deoxygenation reaction in order to produce middle distillates. The catalyst is constituted by an active metal phase constituted by a group VIII element which is dispersed on a support of metal oxide or carbon type. The process also comprises an optional isomerisation step using a catalyst containing a molecular sieve selected from SAPO-11, SAPO-41, ZSM-22, ferrierite or ZSM-23 and a group VIII metal selected from palladium, platinum and nickel, said process being carried out at a temperature of between 200 and 500° C., and at a pressure of between 2 and 15 MPa.

Since the catalysts used for the deoxygenation reaction are metal catalysts, this method leads to the exclusive formation of paraffins by decarboxylation/decarboxylation, and results in the production of carbon oxides. This is advantageous in that the hydrogen consumption is reduced in comparison with hydrodeoxygenation reactions which consume hydrogen due to the production of water, but it means that there is a reduction in the yield of upgradeable product (e.g. middle distillates) owing to the loss of one carbon atom per mole of hydrocarbon in the form of CO or $CO_2$.

Furthermore, the carbon oxides produced as a result of the decarboxylation/decarbonylation reactions give rise to a methanation reaction which has major drawbacks. Indeed, the reactions for methanation of carbon monoxide and carbon dioxide in accordance with the following equations:

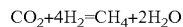

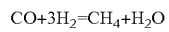

give rise to

1) The formation of water: the water/carbon oxides mixture is well-known to the skilled person for furthering carbon corrosion which is harmful for the materials in the process.

2) Purification of the recycled hydrogen in order to eliminate the carbon oxides, which may, for example, necessitate an additional step which makes washing with amines and/or methanation compulsory.

3) Increased hydrogen consumption associated with these reactions.

It is known that sulfide catalysts are active in respect of the following hydrotreatment reactions: hydrodesullfurization, hydrodenitrogenation, hydrodeoxygenation and hydrometallation.

Numerous writings deal with their potential in the deoxygenation reactions used for the catalytic conversion of bioliquid (originating from oleaginous materials or lignocellulose) into fuel. In particular, Senol et al (Applied Catalysis A: General vol. 326, 2007, p. 236-244) have studied the conversion of a molecule of ester model type, representative of the hydrophilic function (ester group) and lipophilic function (alkyl chain) of triglycerides present in vegetable oils, in the presence of the sulfur catalysts CoMo or NiMo/$Al_2O_3$.

Unlike catalysts with a reduced metal base, the use of solids based on transition metal sulfides permits the production of paraffins from ester type molecule by way of two reaction methods:

Hydrodeoxygenation which results in the formation of water by hydrogen consumption and in the formation of hydrocarbons with a carbon number equal to that of the initial fatty acid chains, Decarboxylation/decarbonylation which results in the formation of carbon oxides (carbon monoxide and carbon dioxide: CO and $CO_2$) and in the formation of hydrocarbons having one carbon less than the initial fatty acid chains.

OBJECT OF THE INVENTION

The present invention is concerned with a supported or unsupported catalyst comprising an active phase constituted by a sulfur-containing group VIB element, the group VIB element being molybdenum, said catalyst in the case of a supported catalyst having a group VIB element content of between 17 and 35% by weight of oxide of said group VIB element in relation to the total mass of the catalyst and also comprising a doping element selected from phosphorus, boron and silicon deposited on said support.

The active phase is the phase containing the element(s) in sulfide form of the metal groups, that is to say here that the active phase of the catalyst according to the invention is constituted by a sulfur-containing group VIB element.

The present invention is also concerned with a hydrodeoxygenation process with conversion by decarboxylation/decarbonylation, restricted to a maximum of 10%, of charges from renewable sources, using a catalyst according to the invention.

The initial charges are charges from renewable sources, such as oils and fats of vegetable or animal origin, or mixtures of such charges, containing triglycerides and/or fatty acids. The vegetable oils used in the present invention can be crude or refined, completely or partially, and originating from the following plants: rapeseed, sunflower, soya, palm, palm kernel, castor bean, olive, coconut, jatropha, this list being non-limitative. Algae oils or fish oils are also used in the present invention. All the animal fats can be cited, such as, for example, lard, suet or fats composed of food industry residues or originating from restauration industries, such as, for example, waste kitchen oil.

The charges thus defined contain triglyceride structures and/or fatty acids, the fatty chains of which have a carbon number of between 8 and 25.

The hydrocarbons produced during conversion of the initial charges according to the invention are characterised by:

a) a carbon atom number which is equal to that of the initial fatty acid chains, if the mechanism is a hydrodeoxygenation mechanism from the carboxylic group to the alkyl group, hydrodeoxygenation resulting in the formation of water by consumption of hydrogen.

b) a hydrocarbon chain containing one carbon atom less than the initial fatty acid chains, if the mechanism used is decarboxylation/decarbonylation, that mechanism resulting in the formation of carbon oxides (carbon monoxide and carbon dioxide: CO and $CO_2$)

c) a degree of branching of the hydrocarbons which is adjusted in order to obtain resistance to cold properties and a cetane index compatible with the standards in force for gas oil.

From the prior art it is known that the two methods of conversion a) and b), namely hydrodeoxygenation and decarboxylation/decarbonylation usually co-exist in the presence of sulfide catalysts.

The purpose of the present invention is therefore to maximise the gas oil yield and/or kerosene yield, and to look for ways of promoting the hydrodeoxygenation mechanism described under a). The selection of the catalysts and operating conditions therefore aims to direct the selectivity so that it is in favour of hydrodeoxygenation, whilst still trying to limit the consumption of hydrogen, particularly that which would result from undesirable reactions, such as methanation, to that which is strictly necessary.

Another purpose of the present invention is to produce middle distillates which are constituted by a good quality gas oil fuel obtained by isomerisation of paraffins from the gas oil cut by limiting their cracking into undesirable lighter fractions, such as, for example, the naphtha cut, and also a kerosene cut which meets requirements, whilst minimising the production of naphthas.

Surprisingly, it has been seen that it was possible to control the selectivity of the hydrodeoxygenation reactions of charges from renewable sources as a function of the type of active phase. In this way, the catalyst according to the invention comprising an active phase constituted by only one group VIB element, the group VIB element being molybdenum and the catalyst being in sulfide form, and, possibly, a mesoporous support of the alumina type, has a very high selectivity for hydrodeoxygenation reactions, and allows decarboxylation/decarbonylation reactions to be limited, and thus the drawbacks caused by the formation of carbon oxides to be restricted.

The catalyst according to the invention thus makes it possible:

1) to maximise the yield of fuel, gas oil and kerosene base,
2) to limit carbon corrosion,
3) to facilitate purification of the recycling hydrogen,
4) to limit the methanation reactions which give rise to increased hydrogen consumption for reactions without added value.

The products, gas oil base and kerosene, obtained with the method of the invention are endowed with excellent characteristics.

The gas oil obtained, after being mixed with a petroleum gas oil originating from renewable charges, such as coal or lignocellulosic biomass, and/or with an additive, is of excellent quality:

its sulfur content is less than 10 ppm by weight.

its total content of aromatics is less than 5% by weight, and the content of polyaromatics is less than 2% by weight.

the cetane index is excellent, above 55.

the density is less than 840 kg/$m^3$, and most frequently above 820 kg/$m^3$.

its kinematic viscosity at 40° C. is 2 to 8 $mm^2$/s.

its resistance to cold properties is compatible with the standards in force, with a cold filter-plugging point of below −15° C. and a cloud point below −5° C.

The kerosene cut obtained, after being mixed with a petroleum kerosene originating from a renewable charge, such as coal or lignocellulosic biomass, and/or with an additive, has the following characteristics:

a density of between 775 and 840 kg/$m^3$ a viscosity at −20° C. of less than 8 $mm^2$/s a freezing point of less than −47° C.

a flash point of above 38° C.

a smoke point of above 25 mm.

DESCRIPTION OF THE INVENTION

The present invention is concerned with a supported or unsupported catalyst comprising an active phase constituted by a sulfur-containing group VIB element, the group VIB element being molybdenum, said catalyst in the case of a supported catalyst having a group VIB element content of between 17 and 35% by weight of oxide of said group VIB element in relation to the total mass of the catalyst and also comprising a doping element selected from phosphorus, boron and silicon deposited on said support.

In accordance with the present invention, said catalyst can be supported. If said catalyst is supported, it advantageously comprises an amorphous inorganic support, preferably selected from the group formed by alumina, silica, silica-aluminas, magnesia, clays and mixtures of at least two of those minerals, and said support is preferably alumina. Said support can also advantageously contain other compounds, such as, for example, oxides selected from the group formed by boron oxide, zirconia, and titanium oxide.

Preferably, the amorphous inorganic support is constituted by alumina only, and, very preferably, by η-, δ- or γ-alumina alone. Thus, in this preferred embodiment, said support does not contain any other compound and is constituted by 100% alumina.

If said catalyst is in supported form, the content of group VIB element is advantageously between 18 and 33% by weight, and, very preferably, between 20 and 32% by weight of oxide of the group VIB element in relation to the total mass of the catalyst.

In accordance with the invention, and if said catalyst is in supported form, said catalyst also comprises at least one doping element selected from phosphorus, fluorine and boron, and, preferably, the doping element is phosphorus in order to attain a high conversion rate whilst maintaining a reaction selectivity for the hydrodeoxygenation method.

In accordance with the invention, and if said catalyst is in supported form, said doping element is advantageously deposited on the support. It is also advantageously possible to deposit silicon on the support, alone or with the phosphorus and/or boron and/or fluorine.

The skilled person knows that these elements have an indirect effect on catalytic activity: better dispersion of the sulfur-containing active phase, and an increase in acidity of the catalyst favourable for hydrotreatment reactions (Sun et al. Catalysis Today 86(2003) 173).

If said catalyst is in supported form, the content of doping element, said doping element preferably being phosphorus, is advantageously strictly above 0.5% and less than 8% by weight of $P_2O_5$ oxide in relation to the total mass of catalyst, and is preferably above 1% and less than 8%, and, very preferably, above 3% and less than 8% by weight.

A preferred catalyst according to the invention is a supported catalyst comprising an active phase constituted by a sulfur-containing group VIB element, the group VIB element being molybdenum, and an amorphous inorganic support constituted by alumina alone, said catalyst having a group VIB element content of between 17 and 35% by weight of oxide of said group VIB element in relation to the total mass of catalyst, and also comprising a doping element selected from phosphorus, boron and silicon, deposited on said support.

If a supported catalyst is used, the hydrogenating function can be introduced onto said catalyst by any method known to the skilled person, such as, for example, co-mixing, dry impregnation, etc. . . .

In accordance with the present invention, said catalyst can alternatively be unsupported, in which case said catalyst does not contain a support.

If said catalyst is an unsupported catalyst, the content of group VIB element is advantageously between 92 and 100% by weight of oxide of the group VIB element in relation to the total mass of the catalyst, preferably above 92% and strictly less than 99.5% by weight, and, preferably, between 92 and 99% by weight, and, very preferably, between 92 and 97% by weight.

The catalyst according to the invention, if said catalyst is an unsupported catalyst, can also advantageously contain at least one doping element selected from phosphorus, fluorine, and boron, and, preferably, the doping element is phosphorus, in order to attain a high conversion rate whilst maintaining a reaction selectivity for the hydrodeoxygenation method.

If said catalyst is an unsupported catalyst, said doping element is advantageously deposited on the active phase.

If said catalyst is an unsupported catalyst, the content of doping element, said doping element preferably being phosphorus, is advantageously strictly above 0.5% and less than 8% by weight of $P_2O_5$ oxide in relation to the total mass of catalyst, and, preferably, above 1% and less than 8%, and, very preferably, above 3% and less than 8% by weight.

If said catalyst is an unsupported catalyst, it is obtained from any of the synthesis methods known to the skilled person, such as direct sulfuration of oxide precursors and thermal decomposition of metal thiosalt.

The present invention is also particularly dedicated to the preparation of gas oil fuel bases which meet new environment standards and kerosene cuts which meet the specifications, from charges originating from renewable sources.

The present invention therefore also relates to a process for the hydrodeoxygenation of charges from renewable sources with conversion by decarboxylation/decarbonylation restricted to a maximum of 10%, using a catalyst according to the invention, at a temperature of between 120 and 450° C., at a pressure of between 1 MPa and 10 MPa, at an hourly space velocity of between $0.1\ h^{-1}$ and $10\ h^{-1}$, and in the presence of a total amount of hydrogen mixed with the charge such that the hydrogen/charge ratio is between 50 and 3000 $Nm^3$ of hydrogen per $m^3$ of charge.

Use of the catalyst according to the invention in the process of the invention makes it possible to limit the formation of carbon oxide for the reasons given hereinabove by limiting decarboxylation/decarbonylation reactions.

Within the context of the invention it is thus possible to maintain global conversion of the charge originating from renewable sources, i.e. conversion by hydrodeoxygenation and by a mix of decarboxylation/decarbonylation, which is advantageously above or equal to 90%, and, preferably, global conversion of the charge equal to 100%, whilst maximising the yield of hydrodeoxygenation product or conversion by hydrooxygenation which remains, according to the invention, so that it is above or equal to 90%, and, preferably, above or equal to 95%, and, preferably, above or equal to 96%.

The conversion by decarboxylation/decarbonylation or yield of decarboxylation/decarbonylation product of the charge originating from renewable sources is advantageously limited to at most 10%, and, preferably, to at most 5%, and, more preferably, to at most 4%.

The hydrodeoxygenation reaction results in the formation of water by hydrogen consumption and in the formation of hydrocarbons with a carbon number equal to that of the initial fatty acid chains. The effluent resulting from hydrodeoxygenation comprises even hydrocarbon compounds, such as C14 to C24 hydrocarbons, and they are largely in majority over the odd hydrocarbon compounds, such as C15 to C23, obtained by decarbonylation/decarboxylation reactions. The selectivity for the hydrodeoxygenation method is revealed by measuring the total yield of hydrocarbons with an even number of carbon atoms and the total yield of hydrocarbons with an odd number of carbon atoms in the liquid fraction which can be upgraded into fuel. The yields of even and odd hydrocarbons which make it possible to arrive at the reaction selectivity (HDO/decarbonylation/decarboxylation) are found by chromatographic analysis in gaseous phase of the liquid reaction effluents which are upgradeable into fuel. The technique of measuring by chromatographic analysis in gaseous phase is a method well-known to the skilled person.

One selectivity by HDO criterion is the ratio of the total yield of hydrocarbons with an even number of carbon atoms to the total yield of hydrocarbons with an odd number of carbon atoms.

According to the hydrodeoxygenation process of the invention, the charge, which has possibly been pre-treated, is contacted with a catalyst according to the invention, at a temperature of between 120 and 450° C., preferably of between 120 and 350° C., preferably of between 150 and 320° C., and, even more preferably, of between 180 and 310° C. The pressure is between 1 MPa and 10 MPa, preferably between 1 MPa and 6 MPa. The hourly space velocity is between $0.1\ h^{-1}$ and $10\ h^{-1}$. The charge is contacted with said catalyst in the presence of hydrogen. The total quantity of hydrogen mixed with the charge is such that the hydrogen/charge ratio is between 50 and 3000 $Nm^3$ of hydrogen per $m^3$ of charge, preferably between 70 and 2000 $Nm^3$ of hydrogen per $m^3$ of charge, and, preferably, between 150 and 1500 $Nm^3$ of hydrogen per $m^3$ of charge.

The hydrodeoxygenation process according to the invention is advantageously carried out in fixed bed or in ebullating bed, and, preferably, in fixed bed.

If the hydrodeoxygenation process is carried out in fixed bed, said process is carried out at a temperature of between 120 and 450° C., preferably of between 120 and 350° C., preferably of between 150 and 320° C., and, still more preferably, of between 180 and 310° C. The pressure is between 1 MPa and 10 MPa, preferably between 1 MPa and 6 MPa. The hourly space velocity is between $0.1\ h^{-1}$ and $10\ h^{-1}$. The charge is contacted with said catalyst in the presence of hydrogen. The total amount of hydrogen mixed with the charge is such that the hydrogen/charge ratio is between 50 and 3000 $Nm^3$ of hydrogen per $m^3$ of charge, preferably between 70 and 2000 $Nm^3$ of hydrogen per $m^3$ of charge, and, preferably, between 150 and 1500 $Nm^3$ of hydrogen per $m^3$ of charge.

If the hydrodeoxygenation process is carried out in ebullating bed said process is carried out at an absolute pressure of 2 to 35 MPa, preferably of 2 to 15 MPa, and, preferably, of 3 to 10 MPa, at a temperature of between 200 and 450° C., preferably of between 250 and 380° C., at an HSV of between $0.1\ h^{-1}$ and $10\ h^{-1}$, and, preferably, of between $0.5\ h^{-1}$ and $5\ h^{-1}$, and with the amount of hydrogen mixed with the charge being between 50 and 5000 normal cubic meters ($Nm^3$) per cubic meter ($m^3$) of liquid charge, preferably between 100 and 1000 $Nm^3$ per $m^3$, and, preferably, between 200 and 500 $Nm^3$ per $m^3$.

It would not come outside the scope of the present invention if one single catalyst, or a plurality of different catalysts according to the invention, were used simultaneously or successively in the hydrodeoxygenation process according to the invention. Said process can advantageously be carried out industrially in one or several reactors with one or several catalytic beds, and, preferably, with a descending mixed flow of gases and of liquid. This type of reactor is commonly called a fixed bed trickle flow reactor by the skilled person.

It is well-known to the skilled person that the reactions which are used are very exothermic. That is to say that they are accompanied by the release of a significant amount of heat. As a result, there is a great increase in temperature of the reaction medium, which can give rise to undesirable effects. Also, the temperature has the effect of increasing the reaction speed, which will then release more heat. This self-sustaining phenomenon absolutely has to be controlled, or else it will lead to very high temperatures which can reach levels higher than the melting points of the materials in the reactor. Without being at that extreme, high temperatures help the cracking reactions to form light hydrocarbons (methane, ethane) which are difficult to upgrade and which proportionally reduce the number of paraffins produced. In general, it seems that controlling the increase in temperature associated with the use of the exothermic reactions involved in this invention is indispensable both for reasons of safety as well as for the overall yield of the process.

To that end, various techniques well-known to the skilled person can be envisaged, such as the method described in WO2008/058664, for example.

Advantageously, the charge can be pre-treated or pre-refined in order to eliminate, by appropriate treatment, contaminants naturally present in bio-liquids from renewable origins, such as alkaline metals, alkaline earth metals, and transition metals such as nitrogen. Suitable treatments can, for example, be: thermal and/or chemical treatments well-known to the person skilled in the art of refining.

Preferably, the optional pre-treatment consists of gentle pre-hydrogenation of said charge in order to hydrogenate the reactive unsaturations. Gentle pre-hydrogenation is advantageously carried out at a temperature of between 50 and 400° C., and at a hydrogen pressure of between 0.1 and 10 MPa, and, preferably, at a temperature of between 150 and 200° C. The pre-hydrogenation catalyst advantageously comprises group VIII and/or group VIB metals, and the pre-hydrogenation catalyst is preferably a palladium-based, nickel-platinum-based, nickel-molybdenum-based catalyst, or a cobalt- and molybdenum-based catalyst, dispersed on a metal oxide or oxide mixture, such as aluminas, silicas, titanium, zeolite.

The metals of the catalysts used in the optional pre-treatment step of the process according to the invention are sulfur-containing metals or metal phases, and, preferably, metal phases.

In order to produce a gas oil fuel with improved properties, the hydrocarbon effluent is then treated in the following optional steps:

The effluent from the hydrodeoxygenation process according to the invention then undergoes at least one separation step, and, preferably, a gas/liquid separation step and a step for the separation of water and at least one liquid hydrocarbon base, said steps being optional and being carried out in any order.

Preferably, the effluent from the hydrodeoxygenation process according to the invention undergoes a gas/liquid separation step. The aim of that step is to separate the gases from the liquid, and, in particular, to recover the gases which are rich in hydrogen and which can also contain gases like CO, $CO_2$, $H_2S$ and propane and at least one liquid effluent, said gases advantageously also being able to be purified by methods known per se to the skilled person, such as methanation for converting CO into $CO_2$, and washing with amines in order to eliminate the $CO_2$.

Preferably, the liquid effluent from the preceding optional gas/liquid separation step then undergoes separation from at least some, and preferably all, of the water formed, from at least one liquid hydrocarbon base, the water being produced at the time of the hydrodeoxygenation reactions.

The aim of this step is to separate water from the liquid hydrocarbon effluent. The elimination of water is understood to be the elimination of the water produced by the hydrodeoxygenation reactions (HDO). Elimination of the water to a greater or lesser extent advantageously depends upon the tolerance to water of the hydroisomerisation catalysts used in the subsequent optional step of the process according to the invention. Water can be removed using any method or technique known to the skilled person, such as drying, passage through a dessicant, flash, solvent extraction, distillation and decanting, or a combination of at least two of these methods.

Optionally, a final purification step of the various pollutants can be carried out by methods known to the skilled person, such as steam stripping or nitrogen stripping, or coalescence and/or capture mass. A step for the elimination of nitrogenous compounds from said hydrocarbon base obtained can advantageously be carried out between the hydrodeoxygenation step according to the invention and an optional hydroisomerisation step.

Preferably, a step for the elimination of nitrogenous compounds is carried out after said optional water separation step, and, preferably, after said final purification step.

The hydrocarbon base resulting from the preceding optional water separation step, or, preferably, from said final purification step, generally contains residual nitrogenous organic compounds which were not eliminated during the hydrodeoxygenation reactions of the process according to the invention. Said residual nitrogenous organic compounds are inhibitors of hydroisomerisation catalysts, and must therefore be eliminated from said hydrocarbon base prior to its passage through an optional hydroisomerisation step. Elimination of the residual nitrogenous organic compounds can be done by any technique known to the skilled person, such as by the use of capture masses, for example. The term, "capture mass" is used to refer to activated or non-activated aluminas, silica-aluminas, zeolites, activated carbons, and ion-exchange resins. Preferably, the step for elimination of the nitrogenous organic compounds is carried out on an ion-exchange resin.

According to one preferred embodiment, at least some of the liquid hydrocarbon base obtained at the end of the step for the afore-mentioned elimination of the nitrogenous organic compounds is hydroisomerised in the presence of a selective hydroisomerisation catalyst. The hydroisomerisation catalysts used are advantageously of bifunctional type, that is to say that they have a hydrogenating/dehydrogenating function and a hydroisomerising function.

Said hydroisomerisation catalyst advantageously comprises at least one group VIII metal and/or at least one group VIB metal as hydrodehydrogenating function and at least one molecular sieve or an amorphous inorganic support as hydroisomerising function.

Said hydroisomerisation catalyst advantageously comprises either at least one noble group VIII metal, preferably selected from platinum or palladium, active in reduced form, or at least one group VI metal, preferably selected from molybdenum or tungsten, in combination with at least one non-noble metal from group VIII, preferably selected from nickel and cobalt, preferably used in their sulfur-containing form.

If the hydroisomerisation catalyst comprises at least one noble metal from group VIII, the total content of noble metal of the hydroisomerisation catalyst used in step d) of the process according to the invention is advantageously between 0.01 and 5% by weight in relation to the end catalyst, preferably between 0.1 and 4% by weight, and, very preferably, between 0.2 and 2% by weight.

Preferably, the hydroisomerisation catalyst comprises platinum or palladium, and, preferably, the hydroisomerisation catalyst comprises platinum.

If the hydroisomerisation catalyst comprises at least one group VIB metal in combination with at least one non-noble group VIII metal, the content of group VIB metal in the hydroisomerisation catalyst used in step c) of the process according to the invention is advantageously, as oxide equivalent, between 5 and 40% by weight in relation to the end catalyst, preferably between 10 and 35% by weight, and, very preferably, between 15 and 30% by weight, and the content of group VIII metal of said catalyst is advantageously, as oxide equivalent, between 0.5 and 10% by weight in relation to the end catalyst, preferably between 1 and 8% by weight, and, very preferably, between 1.5 and 6% by weight.

The metal hydrogenating/dehydrogenating function can advantageously be introduced onto said catalyst using any method known to the skilled person, e.g. co-mixing, dry impregnation, impregnation by exchange.

In one preferred embodiment, said hydroisomerisation catalyst comprises at least one amorphous inorganic support as hydroisomerising function, said one amorphous inorganic support being selected from silica-aluminas and siliceous aluminas, and, preferably, silica-aluminas.

According to another preferred embodiment, said hydroisomerisation catalyst comprises as hydroisomerising function at least one molecular sieve, preferably at least one zeolitic molecular sieve, and, more preferably, at least one mono-dimensional 10 MR zeolitic molecular sieve.

Zeolitic molecular sieves are defined in "Atlas of Zeolite Structure Types", W. M. Meier, D. H. Olsen and Ch. Baerlocher, 5$^{th}$ revised edition, 2001, Elsevier which also makes reference to the present application. The zeolites are classified there in accordance with the size of their pore openings or channels.

Mono-dimensional 10 MR zeolitic molecular sieves have pores or channels with openings defined by a ring of 10 oxygen atoms (10 MR opening). The channels of the zeolitic molecular sieve with a 10 MR opening are advantageously non-interconnected mono-dimensional channels which open directly to the outside of said zeolite. The mono-dimensional 10 MR zeolitic molecular sieves present in said hydroisomerisation catalyst advantageously comprise silicon and at least one element T selected from the group formed by aluminium, iron, gallium, phosphorus and boron, preferably aluminium. The Si/Al ratios of the afore-described zeolites are advantageously those obtained in synthesis, or obtained following post-synthesis dealumination treatments well-known to the skilled person, such as hydrothermal treatments followed or not by acid attack, or direct acid attack by solutions of inorganic or organic acids, this list being non-limitative. They are preferably, almost all, in acid form, i.e. the atomic ratio between the monovalent compensation cation (e.g. sodium) and the T element inserted in the crystalline network of the solid is advantageously less than 0.1, preferably less than 0.05, and, very preferably, less than 0.01. Thus, the zeolites in the composition of said selective hydroisomerisation catalyst are advantageously calcined and exchanged by at least one treatment with a solution of at least one ammonium salt in order to obtain the form of ammonium of the zeolites, which, once calcined, will result in the acid form of said zeolites.

Said mono-dimensional 10 MR zeolitic molecular sieve of said hydroisomerisation catalyst is advantageously selected from the zeolitic molecular sieves of structural type TON, such as NU-10, FER, such as ferrierite, EUO, selected from EU-1 and ZSM-50, alone or mixed, or zeolitic molecular sieves ZSM-48, ZBM-30, IZM-1, COK-7, EU-2 and EU-11, alone or mixed. Preferably, said mono-dimensional 10 MR zeolitic molecular sieve is selected from the zeolitic molecular sieves ZSM-48, ZBM-30, IZM-1 and COK-7, alone or mixed. Still more preferably, said mono-dimensional 10 MR zeolitic molecular sieve is selected from the ZSM-48 and ZBM-30 zeolitic molecular sieves, alone or mixed.

Very preferably, said mono-dimensional 10 MR zeolitic molecular sieve is ZBM-30 zeolite, and, still more preferably, said mono-dimensional 10 MR zeolitic molecular sieve is ZBM-30 zeolite synthesised with the triethylene tetramine organic structuring.

Preferably, the hydroisomerisation catalyst comprises an active metal phase constituted by platinum and a hydroisomerising, ZBM-30-based phase, and, still more preferably, the hydroisomerisation catalyst comprises an active metal phase constituted by platinum and a ZBM-30-based hydroisomerising function synthesised with the triethylenetetramine organic structuring.

The ZBM-30 zeolite is described in EP-A-46 504, and the COK-7 zeolite is described in EP 1 702 888 A1 or FR 2 882 744 A1.

The IZM-1 zeolite is described in FR-A-2 911 866.

The zeolites of structural type TON are described in "Atlas of Zeolite Structure Types", W. M. Meier, D. H. Olson and Ch. Baerlocher, 5$^{th}$ Revised edition, 2001, Elsevier.

The zeolite of structural type TON is described in "Atlas of Zeolite Structure Types", cited hereinabove, and zeolite NU-10 is described in EP-65400 and EP-77624.

ZSM 48 zeolite is described in Schlenker, J. L. Rohrbaugh, W. J., Chu, P., Valyocsik, E. W. and Kokotailo, G. T. Title: "The framework topology of ZSM-48: a high silica zeolite, Reference: Zeolites, 5, 355-358 (1985) Material *ZSM-48"

The zeolite of structural type FER is described in "Atlas of Zeolite Structure Types", cited hereinabove.

The content of mono-dimensional 10 MR zeolitic molecular sieve is advantageously between 5 and 95% by weight, preferably between 10 and 90% by weight, more preferably between 15 and 85% by weight, and, very preferably, between 20 and 80% by weight in relation to the end catalyst.

Preferably, said hydroisomerisation catalyst also comprises a binder constituted by a porous inorganic matrix. Said binder can advantageously be used during the step of shaping said hydroisomerisation catalyst.

Preferably, the shaping is carried out using a binder constituted by a matrix containing alumina, in any form known to the skilled person, and, very preferably, with a matrix containing gamma alumina.

The hydroisomerisation catalysts obtained are advantageously shaped in the form of grains of various shapes and dimensions. They are generally used in the form of cylindrical or polylobed extrudates, such as bilobes, trilabes, polylobes of straight or twisted shape, but can possibly be manufactured and used in the form of crushed powders, tablets, rings, balls, wheels. Techniques other than extrusion, such as pelletizing or drageification, can advantageously be used.

If the hydroisomerisation catalyst contains at least one noble metal, the noble metal contained in said hydroisomerisation catalyst must advantageously be reduced. One of the preferred methods for carrying out reduction of the metal is treatment in hydrogen at a temperature of between 150° C. and 650° C. and a total pressure of between 1 and 250 bar. By way of example, reduction consists in a plateau at 150° C. for two hours, followed by a rise in temperature to 450° C. at a rate of 1° C. per minute, followed by a plateau for two hours at 450° C.; throughout this reduction step, the hydrogen flow rate is 1000 normal cubic meters of hydrogen per cubic meter of catalyst, and the total pressure is kept constant at 1 bar. Any reduction method ex-situ can advantageously be envisaged.

In the hydroisomerisation step, the charge is advantageously contacted, in the presence of hydrogen, with said hydroisomerisation catalyst, at operating temperatures and pressures which advantageously allow hydroisomerisation of the non-converting charge to be performed. This means that hydroisomerisation takes place with conversion of the 150°$^+$ C. fraction into the 150°$^-$ C. fraction of less than 20% by weight, and, preferably, of less than 10% by weight, and, very preferably, of less than 5% by weight.

Thus, the optional hydroisomerisation step in the process according to the invention is advantageously carried out at a temperature of between 150 and 500° C., preferably of between 150° C. and 450° C., and, very preferably, of between 200 and 450° C., at a pressure of between 1 MPa and 10 MPa, preferably of between 2 MPa and 10 MPa, and, very preferably, of between 1 MPa and 9 MPa, at an hourly space velocity which is advantageously between 0.1 h$^{-1}$ and 10 h$^{-1}$, preferably between 0.2 and 7 h$^{-1}$, and, very preferably, between 0.5 and 5 h$^{-1}$, with a hydrogen flow rate such that the ratio of the volume of hydrogen to hydrocarbons is advantageously between 70 and 1000 Nm$^3$/m$^3$ of charge, between 100 and 1000 normal cubic meters of hydrogen per cubic meter of charge, and, preferably, between 150 and 1000 normal cubic meters of hydrogen per cubic meter of charge.

Preferably, the possible hydroisomerisation step is carried out counter-current.

The hydroisomerised effluent then advantageously undergoes, at least partly, and preferably in its entirety, one or more separation operations. The purpose of this step is to separate the gases from the liquid, and, in particular, to recover the gases which are rich in hydrogen and which can also contain light cuts, such as the $C_1$-$C_4$ cut, and at least one gas oil cut and a naphtha cut. Upgrading of the naphtha cut is not the object of the present invention, but that cut can advantageously be sent to a steam cracking unit or catalytic reforming unit.

Processing and Recycling of the Gases

The gas containing hydrogen which has been separated during the optional separation step resulting from the hydrodeoxygenation process according to the invention and/or the optional hydroisomerisation step is, if necessary, advantageously processed, at least in part, in order to reduce its content of light cuts ($C_1$ to $C_4$).

It is possible to add to the recycling gas from the preceding optional separation step a certain amount of sulfur-containing compounds, such as DMDS (dimethyl disulfide), for example, which, by thermal decomposition, produces sulfur-containing hydrogen $H_2S$. This device makes it possible, if necessary, to keep the hydrotreatment catalyst and/or the hydroisomerisation catalyst in the sulfur-containing state. Advantageously, the amount of sulfur-containing compound introduced is such that the content of $H_2S$ in the recycle gas is at least 15 ppm by volume, preferably a minimum of 0.1% by volume, or even a minimum of 0.2% by volume.

It is advantageously possible to introduce recycle hydrogen with the charge entering the hydrodeoxygenation process according to the invention and/or the optional hydroisomerisation step in the form of quenching hydrogen between the catalyst hydrodeoxygenation beds according to the invention and/or hydroisomerisation beds.

The following example clarifies the invention, without, however, limiting the scope thereof.

EXAMPLE

Hydrodeoxygenation

Comparison of Performances of $MoP/Al_2O_3$ Catalysts in Accordance with the Invention and $NiMoP/Al_2O_3$ Not in Accordance with the Invention 50 mL/h of pre-refined rapeseed oil of density 920 kg/m$^3$, with a sulfur content of less than 10 ppm by weight and a cetane index of 35 is introduced into an isothermal reactor with fixed bed charged with 100 mL of hydrotreatment catalyst. 700 Nm$^3$ hydrogen per cubic meter of charge is introduced into the reactor which is maintained at a temperature of 300° C. and at a pressure of 5 MPa. The main characteristics of the rapeseed oil charge used to compare the $MoP/Al_2O_3$ catalysts (HDT1) in accordance with the invention and the $NiMoP/Al_2O_3$ (HDT2) catalysts not in accordance with the invention are listed in Table 1.

The HDT1 catalyst used in accordance with the invention is constituted by a group VIB element, namely molybdenum, and phosphorus in contents of 25.3% by weight of $MoO_3$ and of 6.1% by weight of $P_2O_5$, respectively, on a gamma alumina support.

The HDT2 catalyst used as a comparison is constituted by a group VIB element, namely molybdenum, phosphorus and a group VIII element, namely nickel, in respective contents of 21% by weight of $MoO_3$, 5% by weight of $P_2O_5$ and 4.3% by weight of NiO dispersed on the same type of alumina support. In both cases, the mass ratio of Mo/P is kept constant. The catalysts are prepared by dry impregnation of the oxide precursors in aqueous solution. The preparation method does not limit the scope of the invention.

TABLE 1

| Properties of the Charge | Values |
|---|---|
| Elementary Analysis | |
| S [ppm wt] | 4 |
| N [ppm wt] | 23 |
| P [ppm wt] | 177 |
| C [% wt] | 77.2 |
| H [% wt] | 11.6 |
| O [% wt] | 11.2 |
| Composition of Fatty Acid (%) | |
| 14:0 | 0.1 |
| 16:0 | 5.0 |
| 16:1 | 0.3 |
| 17:0 | 0.1 |
| 17:1 | 0.1 |
| 18:0 | 1.5 |
| 18:1 trans | <0.1 |
| 18:1 cis | 60.1 |
| 18:2 trans | <0.1 |
| 18:2 cis | 20.4 |
| 18:3 trans | <0.1 |
| 18:3 cis | 9.6 |
| 20:0 | 0.5 |
| 20:1 | 1.2 |
| 22:0 | 0.3 |
| 22:1 | 0.2 |
| 24:0 | 0.1 |
| 24:1 | 0.2 |

The HDT1 catalysts and HDT2 catalysts are evaluated in their sulfur-containing form and are sulfurized in situ, prior to the test, using a direct distillation gas oil charge to which DMDS has been added. Following sulfurization in situ, carried out at 350° C., in the pressurised unit, by adding 2% by weight of dimethyldisulfide to the direct distillation gas oil, the charge was modified to become a charge which was made up to 100% with rapeseed oil.

In order to keep the catalyst in the sulfide state, 50 ppm wt of sulfur in the form of DMDS was added to the rapeseed oil. Under the reaction conditions, the DMDS decomposed completely so as to form methane and $H_2S$.

The results obtained for the HDT1 and HDT2 catalysts are listed in Table 2.

TABLE 2

| | HDT2 (not in accordance with the invention) | HDT1 (in accordance with the invention) |
|---|---|---|
| Operating Conditions | | |
| Temperature [° C.] | 300 | 300 |
| Pressure [MPa] | 5 | 5 |
| $H_2$/charge [Nm$^3$/m$^3$] | 700 | 700 |
| Sulfur content [ppm wt] | 50 | 50 |
| Results | | |
| Global conversion (HDO/DCO) [% wt] | 100 | 100 |
| Even HC/odd HC* [% wt/% wt] | 4.6 | 36.4 |
| Total yield of even and odd hydrocarbons [% wt] | 81 | 85 |
| Yield of HDO in liquid upgradeable hydrocarbon effluent % wt | 82.2 | 97.3 |
| Yield of DCO in liquid upgradeable hydrocarbon effluent % wt | 17.8 | 2.7 |

HDO = hydrodeoxygenates, DCO = decarboxylates/decarbonylates
*even HCs = $C_{14}$-$C_{24}$ hydrocarbons; odd HCs = $C_{15}$-$C_{23}$ hydrocarbons It is noted that under the same reaction conditions and for total conversion of the rapeseed oil, the catalyst without nickel has a much more significant selectivity for the hydrodeoxygenation process than the catalyst in the presence of nickel, resulting very selectively in the formation of more than 97% by weight of hydrocarbons ($C_{14}$-$C_{24}$) having an even number of carbon atoms and less than 3% by weight of hydrocarbons ($C_{15}$-$C_{23}$) with an odd number of carbon atoms. This therefore means, firstly, the production of paraffins with a greater carbon number, and, secondly, the very great limitation in the formation of carbon oxides (CO and $CO_2$). Also, the yield of hydrocarbons which can be upgraded into gas oil fuel is thus improved significantly (85% by weight in the presence of catalyst HDT1 and 81% by weight in the presence of catalyst HDT2). (The mass yields stated are obtained by gas-phase chromatography of the liquid reaction effluents which are upgradeable to fuel).

Separation of the Effluent from the Hydrodeoxygenation Step

All of the hydrotreated effluent from step a) is separated in order to recover the gases which are rich in hydrogen and a liquid gas oil base.

Hydroisomerisation of the Hydrotreated Effluent from the Separation Step on a Hydroisomerisation Catalyst The hydroisomerisation catalyst is a catalyst containing a noble metal and a mono-dimensional 10 MR ZBM-30 zeolite. This catalyst is obtained by way of the method described hereinafter. The ZBM-30 zeolite is synthesised in accordance with the BASF Patent EP-A-46504 with the triethylenetetramine organic structuring. The crude ZBM-30 zeolite from synthesis undergoes calcining at 550° C. in a dry air flow for 12 hours. The H-ZBM-30 zeolite (acid form) thus obtained has an Si/Al ratio of 45. The zeolite is mixed with a type SB3 alumina gel supplied by the company, Condéa-Sasol. The mixed paste is then extruded through a die of diameter 1.4 mm. The extrudates thus obtained are calcined at 500° C. for 2 hours in air. The content by weight of H-ZBM-30 is 20% wt. The supporting extrudates then undergo a dry impregnation step by means of an aqueous solution of platinum salt $Pt(NH_3)_4^{2+}, 2OH—$, and they then undergo a maturing step in a soaking drum with water for 24 hours at ambient temperature, and are then calcined for two hours, in dry air, in a traversed bed, at 500° C. (ramp with temperature rise at the rate of 5° C. per minute). The content by weight of platinum of the end catalyst, following calcination, is 0.48%.

The effluent obtained following hydrotreatment of the rapeseed oil in the presence of the HDT1 catalyst (according to the invention) is hydroisomerised with lost hydrogen (i.e. non recycled hydrogen) on catalyst C1 in a hydroisomerisation reactor under the operating conditions described below:

HSV (volume of charge/volume of catalyst/hour)=1 $h^{-1}$
total operating pressure: 5 MPa
hydrogen/charge ratio: 700 normal liters/liter The temperature is adjusted to produce conversion of the 150° C.$^+$ fraction into the 150° C.$^-$ fraction of less than 5% by weight during hydroisomerisation. Prior to testing the catalyst undergoes a reduction step under the following operating conditions:

hydrogen flow rate: 1600 normal liters per hour and per liter of catalyst
ambient temperature rise to 120° C.: 10° C./min
plateau for one hour at 120° C.
rise from 120° C. to 450° C. at 5° C./min
plateau for two hours at 450° C.
pressure: 0.1 MPa The hydroisomerised effluent is then characterised. The fuel yields and fuel properties are given in Tables 3, 4 and 5.

TABLE 3

Yield

| | Yield (% wt) |
|---|---|
| Yield of 150° C.$^-$ cut [% wt] | 3 |
| Yield of 150° C.-250° C. cut (kerosene cut) [% wt] | 10 |
| Yield of 250° C.$^+$ cut (gas oil cut) [% wt] | 87 |

TABLE 4

Characterisation of Gas Oil Base

| | Characteristic of Gas Oil Base |
|---|---|
| Cetane index (ASTMD613) | 75 |
| Cold filter-plugging point (° C.) | −15 |
| Sulfur (ppm wt) | 1 |
| Density (kg/m$^3$) | 790 |
| Aromatics content (% wt) | <0.2 |

TABLE 5

Characterisation of Kerosene Base

| | Characteristic of Kerosene Cut |
|---|---|
| Density (kg/m$^3$) | 770 |
| Smoke point (mm) above 25 mm. | 30 |
| Viscosity (mm$^2$/s) at −20° C. to 8 | 6 |

The specifications for density, freezing point and flash point are obtained by mixing with a petroleum kerosene.

The process according to the invention therefore permits the production of gas oil and kerosene bases, whilst reducing the production of naphthas.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application Ser. No. 08/07,416, filed Dec. 23, 2008 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process comprising conducting a step of catalytic hydrodeoxygenation of at least one charge from at least one renewable source resulting in a hydrodeoxygenation product yield of more than or equal to 90%, with conversion by decarboxylation/decarbonylation limited to a maximum of 10% wherein the catalyst is a supported or unsupported catalyst comprising an active phase consisting of only one sulfur-containing group VIB element, the group VIB element being molybdenum, said catalyst in the case of a supported catalyst, having a group VIB element content of between 17 and 35% by weight of oxide of said group VIB element in relation to the total mass of the catalyst, said supported or unsupported catalyst also comprising a doping element selected from phosphorus, boron and silicon deposited on said support, said step of hydrodeoxygenation being conducted at a temperature of between 120 and 450° C., at a pressure of between 1 MPa and 10 MPa, at an hourly space velocity of between 0.1 $h^{-1}$ and 10 $h^{-1}$ and in the presence of a total amount of hydrogen mixed with the charge such that the hydrogen/charge ratio is between 50 and 3000 Nm$^3$ of hydrogen per m$^3$ of charge.

2. The process according to claim 1, in which said catalyst is a supported catalyst and comprises an amorphous inorganic support selected from alumina, silica, silica-aluminas, magnesia, clays, and mixtures thereof.

3. The process according to claim 2, in which said supported catalyst contains a phosphorus content which is strictly above 0.5% and below 8% by weight of $P_2O_5$ oxide in relation to the total mass of the catalyst.

4. The process according to claim 2, in which said supported catalyst comprises an alumina amorphous inorganic support.

5. The process according to claim 4, in which said supported catalyst comprises an amorphous inorganic support constituted by alumina alone.

6. The process according to claim 5, in which said supported catalyst contains a phosphorus content which is strictly above 0.5% and below 8% by weight of $P_2O_5$ oxide in relation to the total mass of the catalyst.

7. The process according to claim 4, in which said supported catalyst contains a phosphorus content which is strictly above 0.5% and below 8% by weight of $P_2O_5$ oxide in relation to the total mass of the catalyst.

8. The process according to claim 1, in which said yield of hydrodeoxygenation product is above 96%.

9. The process according to claim 1, in which said process is carried out in fixed bed.

10. The process according to claim 1, in which said process is carried out in ebullating bed.

11. The process according to claim 1, further comprising withdrawing effluent resulting from hydrodeoxygenation and subjecting said effluent to at least one separation step of at least one liquid hydrocarbon base.

12. The process according to claim 11, comprising separating water from said effluent and then eliminating nitrogenous compounds from said liquid hydrocarbon base.

13. The process according to claim 12, wherein at least part of resultant liquid hydrocarbon base obtained at the end of the step for elimination of the nitrogenous organic compounds is hydroisomerised in the presence of a hydroisomerisation catalyst.

14. The process according to claim 13, wherein said hydroisomerisation catalyst comprises at least one group VIII metal and/or at least one group VIB metal as hydrodehydrogenating function and at least one amorphous inorganic support as hydroisomerising function.

15. The process according to claim 14, in which said hydroisomerisation catalyst comprises an active metal phase comprising platinum, and a ZBM-30-based zeolite.

16. The process according to claim 1, in which said catalyst is a supported catalyst and comprises an amorphous inorganic support selected from alumina, silica, silica-aluminas, magnesia, clays and mixtures thereof.

17. The process according to claim 1, in which said catalyst comprises an alumina amorphous inorganic support.

18. The process according to claim 17, in which resultant supported catalyst comprises an amorphous inorganic support constituted by alumina alone.

19. The process according to claim 17, in which resultant supported catalyst contains a phosphorus content which is strictly above 0.5% and below 8% by weight of $P_2O_5$ oxide in relation to the total mass of the catalyst.

20. A process according to claim 1, wherein the at least one charge comprises rapeseed oil.

21. A process according to claim 1, wherein the hydrodeoxygenation yield is above or equal to 95%.

22. A process according to claim 1, wherein the hydrodeoxygenation yield is above or equal to 96%.

* * * * *